United States Patent [19]

Davis et al.

[11] 4,419,470
[45] * Dec. 6, 1983

[54] WOOD DERIVED, THERMOPLASTIC ESTER MIXTURES AS A SUBSTITUTE FOR PETROLEUM-DERIVED COMPONENTS IN COMPOUNDED RUBBER STOCKS

[75] Inventors: James A. Davis, Uniontown; Robert C. Koch, Akron, both of Ohio

[73] Assignee: The Firestone Tire & Rubber Company, Akron, Ohio

[*] Notice: The portion of the term of this patent subsequent to Apr. 13, 1999 has been disclaimed.

[21] Appl. No.: 359,739

[22] Filed: Mar. 19, 1982

Related U.S. Application Data

[63] Continuation-in-part of Ser. No. 193,198, Oct. 2, 1980, Pat. No. 4,324,710.

[51] Int. Cl.³ .................. C08L 93/04; C09F 1/00
[52] U.S. Cl. ........................... 524/76; 524/274; 260/108; 260/109; 260/110
[58] Field of Search .............. 260/108, 109, 110; 524/76, 274

[56] References Cited

U.S. PATENT DOCUMENTS 4,324,710  4/1982  Davis et al. ................. 524/76

*Primary Examiner*—John Kight, III
*Assistant Examiner*—M. L. Moore
*Attorney, Agent, or Firm*—Daniel N. Hall

[57] ABSTRACT

Naturally occurring dark, tacky, low softening thermoplastic resins of low acid number can be used as substitutes for all or part of the non-elastomeric petroleum-derived components of rubber stocks used for manufacture of tires and other rubber articles. For example, such resins can be used to replace petroleum-derived process oils or resins, or both, used in making tires. The resins, which are derived from wood, are low softening thermoplastic resins characterized by having about 15–30% unsaponifiables, 3–20% rosin acids, 3–15% fatty acids and 5–15% sterols. A typical useful resin is commerically available under the name Pamak TP.

11 Claims, No Drawings

WOOD DERIVED, THERMOPLASTIC ESTER MIXTURES AS A SUBSTITUTE FOR PETROLEUM-DERIVED COMPONENTS IN COMPOUNDED RUBBER STOCKS

REFERENCE TO RELATED APPLICATIONS

This application is a continuation-in-part of U.S. Ser. No. 193,198 filed Oct. 2, 1980 now U.S. Pat. No. 4,324,710.

FIELD OF THE INVENTION

The present invention relates to the replacement of various non-elastomeric petroleum-derived components in fully compounded rubber stocks. More particularly it is directed to replacement of petroleum-derived resins or process oils, or both, in rubber stocks normally used in the manufacture of tires and other articles made of rubber.

GENERAL BACKGROUND AND PRIOR ART

Wood-derived resins, which are compatible with a variety of film-forming resins, and yet are substantially insoluble in some commonly used solvents such as aliphatic hydrocarbons, have found use in the formulation of coatings and plastics resistant to such materials. Such resins have also been utilized in adhesives, emulsions, cements, electrical insulation impregnants, inks, coating and bonding materials, and plastics. Use, however, in the rubber field has been limited to general purpose rubber compounding and rubber reclaiming. Thermoplastic resins obtained from wood have not been used in rubber stocks, nor, more specifically, as replacements for petroleum-derived process oils and/or resins, which are utilized in rubber stocks. Certain naturally occurring rosin-derived resins have been reportedly added to rubber tread stocks to compensate for the effect of carbon black therein; see U.S. Pat. No. 4,252,171 to Imai, et al.

SUMMARY DESCRIPTION OF THE INVENTION

Through practice of the invention, it is possible to make improved rubber stocks containing conventional components, wherein the improvement comprises replacing at least a portion of a petroleum-derived product in the stock with a thermoplastic resin comprising carboxylic acid ester groups and derived from wood. Both said petroleum-derived product and said resin are not elastomeric and constitute minor portions of the total stock.

Thus, a naturally occurring, low softening thermoplastic resin of low acid number is added as a partial or complete replacement for various non-elastomeric petroleum-derived rubber stock components such as process oils, petroleum-derived resins, tackifiers, softeners, extenders, processing aids, and the like. The thermoplastic resins are dark, tacky viscous liquids typically having a softening point (by the Hercules drop method) of approximately 35° C. to about 80° C. and an acid number between about 20-40. The resin further has a saponifiable fraction, comprising carboxylic ester groups, a non-saponifiable fraction, a rosin-acid fraction and sterol components. The thermoplastic resin is further characterized by the fact that the saponifiable fraction contains esters of resin acids and fatty acids of the general type associated with tall oil.

More specifically, the thermoplastic resins of the present invention are dark, tacky, viscous liquids derived from wood pulp used in the manufacture of paper. Such pulp is made by dissolving the lignin in hot solutions of (1) sodium hydroxide, (2) calcium, magnesium or ammonium bisulfite, or (3) a mixture of sodium hydroxide and sodium sulfide (made from lime and reduced sodium sulfate). Pulp treated by the above process (sulfate process) yields, for each ton of paper, about 50 pounds of crude tall oil, which consist of about 50 percent unsaturated fatty acids, chiefly oleic and linoleic acids, and about 50 percent of a rosin acid mixture. The bulk of the fatty acids are removed from the crude tall oil by fractionation. The "bottoms" remaining after the fatty acid fractionation represent the material from which the resins of this invention are derived.

A specific useful thermoplastic resin is Pamak TP, manufactured by Hercules, Incorporated, Wilmington, Del., USA. Pamak TP (a trademark of Hercules) is commercially available generally as a liquid having a viscosity of about 3520 SUS at 100° C. and a specific gravity of about 1.007 at 25° C. These low acid and low softening thermoplastic resins are used in replacing process oils, such as conventional aromatic oils, and petroleum-derived resins, and the like, normally used in rubber stocks for tire manufacture, as for example, tread ply skims, body ply skims, sidewalls, innerliners, stabilizer ply inserts, bead fillers, toe fillers, chafers, undertreads and treads. The substitution of the thermoplastic resin for all or a portion of these non-elastomeric conventional components does not have any adverse effect on the physical properties of the rubber stock and, in fact, unexpectantly improves both the 100° C. tear properties, and 100° C. ring tensile, and results in higher cured stock durometer properties.

Cured rubber stock containing conventional rubber components and the above-described components are also within the scope of the invention. These cured rubber stocks are often layers in a rubber article such as a tire. These thermoplastic, non-elastomeric resins function as processing aids, softeners, extenders, plasticizers and the like.

An advantage of the present invention lies in the replacement of relatively high cost petroleum-derived components with lower cost materials derived from a renewable resource, namely wood. Additional advantages accrue from the resins' relatively low softening points, which soften the rubber, and low acid number, which tend to lessen the cure retardation found with some other possible resin components.

DETAILED DESCRIPTION OF THE INVENTION INCLUDING THE PRESENTLY KNOWN BEST MODE FOR CARRYING IT OUT

In the manufacture of rubber articles such as tires, several structural components actually make up the tire. Thus, some of the structural rubber components found in a typical tire, often as one or more layers, include a tread ply skim, body ply skim, bead filler, innerliner, sidewall, stabilizer ply insert, toe filler, chafer, undertread, tread, and the like. Most of the components utilized in the various layers of a tire or rubber article are made from petroleum materials and particularly those of non-rubbery, that is non-elastomeric, petroleum-derived materials. Such materials are rapidly escalating in cost, as well as facing the distinct possibility of becoming scarce in the future.

According to the present invention, it has been unexpectedly found that a type or class of naturally occurring resins can be partially or totally substituted for a petroleum product utilized in the various tire components and layers, specifically for petroleum-derived process oils and resins, as well as for tackifiers, softeners, extenders, plasticizers, and processing aids, all known to those skilled in the art. By process oils, it is meant oils such as aromatic oils, naphthenic oils, paraffinic oils, and blends thereof. Many such petroleum-derived process oils are known to those skilled in the arts of rubber formulation and manufacture. By petroleum-derived resins, it is meant resins derived from petroleum sources, either directly or indirectly. Usually such resins are hydrocarbon in nature. Specific examples include Piccotac, Piccolyte, Piccodiene, and Piccopale, all manufactured by Hercules, the Resinex resins distributed by Harwick, the Nevex 100 resins made by the Neville Chemical, polyterpene resins, coumarone-indene resins, and the like. Tackifiers relate to building tack as required in "piled up" products such as tires, belts, and various types of hose. An example of a tackifier is a phenolic resin. Softeners permit the rapid incorporation of fillers and other ingredients into rubber, and thereby reduce mixing power consumption. They also reduce internal friction in calendering and extrusion operations, thus minimizing rubber scorch and reducing processing time. Softeners are also used in compounding for lower modulus and hardness as required in some applications. Plasticizers, low cost petroleum-derived resins and oils, are specific examples of softeners. Extenders are added to rubber compounds to adjust the physical condition of a product. Low cost process oils and mineral fillers, e.g., clay, serve as extenders. A processing aid is a material, generally added to rubber in an amount of from 2 to about 5 parts per 100 parts of rubber hydrocarbon to aid in stock processing; for example, it can be added with fillers, e.g., carbon black, Hi Sil, etc., for better mixing and filler dispersion as well as to improve polymer solubility (in polymer blends) or at the end of a mix cycle to improve mixing and calendering. Additionally, processing aids reduce mixing time, improve filler and pigment (zinc oxide, resins, etc.) dispersion, lower mixing temperature, reduce mixing energy consumption, and enhance stock processing (tubing, extruding, etc.) and mold release of the cured part. A typical processing aid is Struktol WB212, manufactured by the Struktol Company of America.

The amount of non-elastomeric petroleum-derived component which exists in a rubber stock is minor and will vary with the type of stock as well as with the specific component, e.g., petroleum-derived resin, process oil, tackifiers, etc., and is well known to the art. Generally, such amounts are usually less than about 12 or 15 percent by weight of the total stock weight, and often between 2 and 6 percent by weight.

The thermoplastic resins used in this invention have softening points of approximately 35°–80° C. (Hercules drop method), acid numbers of about 20–40, typically about 20–35, and are soluble in acetone, terpene solvents, benzene, ether and chlorinated hydrocarbons. The thermoplastic resin further contains esterified carboxylic acid groups therein. These thermoplastic resins, of relatively low softening point and acid number, also can be characterized by having about 15–30% unsaponifiables, 3–20% rosin acids, 3–15% fatty acids and 5–15% sterols. The acids and sterols can be in ester or free form in the original, unsaponified resin. Their resins' ash contents are typically about 0.3–1%.

Typically, the above-described resins are obtained from Southern pine wood. Naturally, the material can vary somewhat from pine tree grove to pine tree grove, as well as from area of country to area of country, and from the type of particular recovery process utilized, and the like. Generally, however, they exhibit parameters within the ranges set forth hereinabove.

The thermoplastic resins of the present invention can be substituted for petroleum-derived rubber formulation components in desirable proportions, such as generally at least 25 percent by weight, or at least 50 percent of the component replaced by weight, and preferably totally substituted for the various oils, petroleum-derived resins, as well as tackifiers, softeners, extenders, and processing aids, described hereinabove. The amount which can be utilized can vary from about one-half part to about 10 or 25 parts for every 1 part of petroleum-derived process oil or resin, non-elastomeric petroleum-derived product, etc., replaced. A more desirable range is from about one-half to about 10 parts with a range of approximately 1 to 1 being preferred.

The thermoplastic resins derived can be blended with various rubber stocks, according to any conventional or known manner. Generally, they can be used in any conventional rubber stock formulation or other known formulations as a complete replacement for the above-noted specific components, especially for the petroleum-derived process oil and resins. Such rubber stock formulations are well known to those skilled in the art and include the various layers having conventional components therein utilized in making a tire. Such formulations can generally be found in any number of rubber handbooks, textbooks, and the like.

The present invention also finds utility in, for example, motor mounts, rubber bushings, torsilastic springs, power belts, printing rolls, rubber shoe heels and soles, rubber floor tiles, caster wheels, elastomeric seals and gaskets, conveyor belt covers, wringer rolls, hard rubber battery cases, automobile floor mats, mud flaps for trucks, ball mill liners, and the like.

To ensure that the thermoplastic resin is uniformly dispersed in the rubber stock, regardless of product type, desirably, the resin is added to the particular mixing device, i.e., a B-size Banbury mixer, after the final carbon black addition.

Natural rubber, synthetic rubbers, and blends thereof can be used in the present invention. Such elastomers include polydienes made from conjugated dienes having from 4 to 10 carbon atoms, such as polybutadiene or polyisoprene, natural rubber (i.e., cis-1,4-polyisoprene), copolymers of dienes such as butadiene or isoprene with other copolymerizable vinyl substituted aromatic monomers, for example, those having from 8 to 12 carbon atoms, such as styrene, alpha-methylstyrene, etc., an acrylic ester, methylisopropenylketone, isobutylene, acrylonitrile or an unsaturated carboxylic acid; halogenated rubbers such as polychloroprene or fluororubbers; interpolymers of one or more monoolefins with a monomer which confers unsaturation on the interpolymer, for example, an unsaturated ethylene/propylene/-dicyclopentadiene terpolymer, sulfur-vulcanizable polyurethane rubbers, butyl rubber containing at least 0.8 percent unsaturation; and combinations of the above elastomers, e.g., natural rubber/butadienestyrene copolymer blends, a mixture of a saturated copolymer of ethylene and propylene with an unsaturated interpolymer of ethylene, propylene and a monomer comprising unsaturation in the interpolymer, etc.

The substitution of the thermoplastic resin as set forth herein has been found not to cause any adverse results when utilized in various rubber stocks such as a tread ply skim stock, sometimes referred to as a wire, steel cord, breaker or stabilizer ply skim stock, used in the manufacture of steel belted radial tires. The thermoplastic resin may be utilized in other rubber stocks for making a tire, as noted above, for example, body ply skim, innerliner, sidewall, stabilizer ply insert, bead filler, toe filler, chafer, undertread, tread stocks, and the like. Preferably, the thermoplastic resin is used to replace the petroleum-derived process oil or resin, or both, in the innerliner, the tread ply skim, and the tread stock.

The thermoplastic resins of the present invention can be used in typical or conventional rubber compositions, especially those, as previously noted, used in making various tire components. Thus, for the most part, the thermoplastic resins are compatible with the rubber compositions and various compounding additives such as antioxidants, accelerators, sulfur, carbon black, cure retarders, clay fillers, activators, processing aids, inert fillers, etc., which are present in the rubber stock.

As apparent from the examples set forth below, unexpected improvements are obtained when the thermoplastic resin was utilized in a conventional tread ply skim; namely, slightly higher 100° C. ring tensile and higher cured stock durometer were achieved, better 100° C. ring tear properties, and so forth.

The invention will be better understood by reference to the following examples which are intended to illustrate but in no way limit the scope of the invention. In these examples, as elsewhere in this specification and the appended claims, all parts and percentages are by weight and temperatures in degrees Celsius, unless indicated to the contrary.

Stock A, a conventional body ply skim stock, is prepared using a B-size laboratory Banbury mixer; the amount of each compounding ingredient is based on parts per hundred parts rubber hydrocarbon or synthetic polymer (i.e., phr).

| Compounding Ingredients (parts by weight) | Stock A |
|---|---|
| Natural Rubber | 50 |
| SBR-oil extended*[1] | 57.5 |
| Nitrol*[2] | 0.60 |
| GPF Black (ASTM N660) | 104 |
| Zinc Oxide | 3 |
| Stearic Acid | 1 |
| Piccopale 100 resin*[3] | 12 |
| Naphthenic Process Oil*[4] | 27.5 |
| Sulfur | 1.80 |
| Santocure NS*[5] | 1.90 |

*[1] SBR copolymer - extended with 15 parts of a naphthenic process oil per 100 parts rubber hydrocarbon, 23.5% bound styrene, 0.94 specific gravity at 25° C.
*[2] N—(2-methyl-2-nitropropyl)-4-nitrosoaniline (33.3%) plus Whitex clay (66.7%)
*[3] Non-reactive, aliphatic hydrocarbon resins, 0.97 specific gravity at 25° C.
*[4] A known oil of medium solvency containing a 35% minimum of naphthene ring carbons, 0.919 specific gravity at 25° C.
*[5] N—tert-butyl-2-benzothiazole-sulfenamide The following sequence of addition and mixing times are used to prepare the rubber masterbatch for the control stock; 100 parts rubber hydrocarbon (50 parts natural rubber and 57.5 parts oil extended SBR) and 1.0 phr stearic acid are initially added to the Banbury mixer. After 0.5 to 1.0 minute, about 50 percent of a blend of 104 phr GPF black, 3.0 phr zinc oxide, 0.6 phr nitrol, and 12 phr piccopale 100 resin are Banbury mixed into the above composition.

Mixing is then continued and after two to three minutes of continued mixing, the remainder of the above blend is introduced; after about 3.5 minutes of mixing, 27.5 phr of naphthenic process oil is added to the rubber masterbatch.

Mixing is continued for an additional three minutes to insure a uniform dispersion of the additives, the total mixing time is about 6.5 minutes, and the mixing temperature for the rubber masterbatch was about 143° to 155° C. at the completion of the mixing cycle. The rubber mixture is then dumped on a two roll mill for final mill mixing; the rubber masterbatch is then allowed to cool to about 50° C. before adding the curatives.

To the above rubber masterbatch on the two roll mill, is added: A cure package consisting of 1.8 phr sulfur and 1.9 phr Santocure NS was added. Mill mixing is continued for about 10 to 20 minutes at a mill roll temperature ranging between 65° C. and 80° C.

The conventional body ply skim (Stock A) is utilized as a (Example I) control. In Example 2, 13.75 phr of naphthenic process oil used in the rubber masterbatch is replaced with an equal level of Pamak TP. In Example 3, 27.5 phr naphthenic process oil is replaced with an equal level of Pamak TP. Examples 2 and 3 are prepared in the same manner as Stock A in Example I. Example I (Control) and Example 2 and 3 are tested for various physical properties as set forth in Table I.

TABLE I

| Effects of Pamak TP as a Process Oil Replacement in Stock A | | | |
|---|---|---|---|
| | Example I (control) | Example 2 | Example 3 |
| Polymer amount and type | 50/50 NR/SBR | 50/50 NR/SBR | 50/50 NR/SBR |
| Naphthenic process oil, phr | 27.50 | 13.75 | — |
| Pamak TP, phr | — | 13.75 | 27.50 |
| Monsanto Rheometer at 300° F., Mini-die, 100 RPM, 1° Arc | | | |
| Scorch time, min. | 15.0 | 14.7 | 15.6 |
| Time to 90% cure, min. | 22.0 | 22.6 | 24.3 |
| Min. torque, dN.m | 6.9 | 7.2 | 7.0 |
| Torque at 90% cure, dN.m | 27.8 | 26.6 | 26.0 |
| Max. torque, dN.m | 30.1 | 28.8 | 28.1 |
| Cure Rate Index (CRI) | 14.3 | 12.7 | 11.5 |
| Unaged Stress-Strain Properties at 23° C. - Slabs Cured 23' at 149° C. | | | |
| 100% Modulus Kg./cm$^2$ | 34.09 | 31.63 | 29.88 |
| 300% Modulus Kg./cm$^2$ | 153.6 | 125.5 | 112.5 |
| Tensile Strength Kg./cm$^2$ | 153.6 | 145.87 | 140.6 |
| Elongation at Break Percent | 302 | 362 | 398 |
| Heat Aged Stress-Strain Properties at 23° C. - Slabs Cured 23' at 149° C. - Slabs Heat Aged 2 Days at 100° C. | | | |
| Tensile Strength Retention, % | 94.5 | 101.9 | 96.3 |
| Elongation at Break, % Retention, % | 62.8 | 75.4 | 70.9 |
| Stress-Strain Properties at 100° C. - Slabs Cured 23' at 149° C. | | | |
| 100% Modulus Kg./cm$^2$ | 43.58 | 35.85 | 31.63 |
| 300% Modulus Kg./cm$^2$ | — | 97.7 | 82.6 |
| Tensile Strength Kg./cm$^2$ | 89.6 | 101.9 | 98.4 |
| Elongation at Break Percent | 200 | 330 | 410 |
| Ring Tear at 100° C. - Slabs Cured 23' at 149° C. | | | |
| Kg./cm | 66.3 | 68.6 | 75.7 |
| Shore "A" Hardness - Rebound Block - Cured 35' at 149° C. | | | |

TABLE I-continued

Effects of Pamak TP as a Process Oil Replacement in Stock A

|  | Example I (control) | Example 2 | Example 3 |
|---|---|---|---|
| Tested at 23° C. | 61 | 64 | 66 |

As apparent from the above examples the replacement of thermoplastic resins for a portion of the naphthenic process oil in Stock A does not produce any adverse effects on the physical properties of the rubber stock and, in fact, unexpectantly improves its heat aged tensile and elongation retention, 100° C. ring tensile, 100° C. ring tear properties and results in higher cured stock durometer. Such improvements are further noted when thermoplastic resins are tested as a total replacement for naphthenic process oil in Stock A, a conventional body ply skim.

Stock B, a conventional tread ply skim, is prepared using a B-size laboratory Banbury mixer; the amount of each compounding ingredient is based on parts per hundred parts rubber hydrocarbon (i.e., phr) by weight according to the weight of the rubber, unless otherwise specified.

| Compounding Ingredients (parts by weight) | Stock B |
|---|---|
| Natural Rubber | 100 |
| HAF Black (ASTM N330) | 60 |
| Zinc Oxide | 8 |
| Stearic Acid | 0.50 |
| Santoflex DD*[6] | 1 |
| Santoflex 13*[7] | 1 |
| Naphthenic Process Oil*[8] | 8 |
| NOBS Special Accel.*[9] | 0.70 |
| Sulfur | 3 |

*[6] 6-dodecyl-1,2-dihydro-2,2,4-trimethylquinoline
*[7] N—(1,3 dimethylbutyl)-N′ phenyl-p-phenylenediamine
*[8] A known oil of medium solvency containing a 35% minimum of naphthene ring carbons, 0.919 specific gravity at 25° C.
*[9] N—oxydiethylene benzothiazole-2-sulfenamide The following sequence of addition and mixing times are used to prepare the rubber masterbatch for Stock B (control): 100 parts natural rubber and 0.50 phr stearic acid are initially added to the B-size laboratory Banbury mixer. After 0.50 to 1.0 minute, about 50 percent of a blend of 60 phr HAF black and 8 phr zinc oxide are Banbury mixed into the above composition.

Mixing is then continued and after two to three minutes of mixing, the remainder of the above blend is introduced; after about 3.5 minutes of continuous mixing, 1 phr Santoflex DD and 8 phr naphthenic process oil is added to the rubber masterbatch. Mixing is continued for an additional 3 minutes to ensure a uniform dispersion of the additives, the total mixing time is about 6.5 minutes, and the masterbatch dump temperature is between 160° C. and 174° C. at the completion of the mixing cycle. The rubber masterbatch is then dumped on a two roll mill for final mill mixing; the rubber masterbatch is allowed to cool to about 50° C. before adding the curatives.

To the above rubber masterbatch on the two roll mill is added the following sequence of materials. Initially, 0.1 phr Santoflex 13 is added; next, after continued mill mixing, 3.7 phr of a cure package consisting of 3.0 phr sulfur MB and 0.70 phr NOBS Special accelerator is added. Mill mixing is continued for about 10 to 12 minutes at a mill roll temperature ranging between 65° C. and 80° C.

The conventional tread ply skim (Stock B) is employed as a (Example 4) control. In Example 5, 8.0 phr of naphthenic process oil utilized in the rubber masterbatch is replaced with an equivalent amount of the thermoplastic resin manufactured by Hercules, Inc. The rubber tread ply skim stock in Example 5 is prepared in the same manner as Stock B (control). Examples 4 and 5 are tested for various physical properties set forth in Table II.

TABLE II

Effects of Pamak TP As a Process Oil Replacement in Stock B

|  | Example 4 (Control) | Example 5 |
|---|---|---|
| Natural Rubber | 100 | 100 |
| Naphthenic process oil, phr | 8 | — |
| Pamak TP, phr | — | 8 |
| Sulfur, phr | 3 | 3 |
| NOBS Special, phr | 0.70 | 0.70 |
| Monsanto Rheometer at 149° C., Mini-die, 100 RPM, 1° Arc | | |
| Time to scorch, min. | 5.3 | 5.6 |
| Time to 90% cure, min. | 12.1 | 15.7 |
| Min. torque, dN.m | 9.8 | 9.6 |
| Torque at 90% cure, dN.m | 31.5 | 35.2 |
| Max torque, dN.m | 33.9 | 38.0 |
| Cure Rate Index (CRI) | 14.7 | 9.9 |
| Unaged Stress-Strain Properties at 23° C. - Cured 23′ at 149° C. | | |
| 100% Modulus Kg./cm² | 30.23 | 31.63 |
| 200% Modulus Kg./cm² | 79.08 | 79.44 |
| Tensile Strength Kg./cm² | 140.6 | 173.98 |
| Elongation at Break Percent | 297 | 360 |
| Heat Aged Stress-Strain Properties at 23° C. - Slabs cured 23′ at 149° C. - Slabs Heat Aged 2 days at 100° C. | | |
| 200% Modulus Kg./cm² | 105.45 | 107.2 |
| Tensile Strength Kg./cm² | 173.98 | 191.56 |
| Elongation at Break Percent | 250 | 330 |
| Ring Tear at 100° C. - Slabs Cured 23′ at 149° C. | | |
| Kg./cm | 92.34 | 116.98 |
| Shore "A" Hardness - Rebound Block - Cured 35′ at 149° C. | | |
| Tested at 23° C. | 62 | 67 |

It is apparent from the above examples that the addition of a thermoplastic resin for the naphthenic process oil does not adversely affect various physical properties and, for the most part, unexpectantly improves such properties. The improvements are namely, higher unaged and heat aged ring tensile strength, 100° C. tear properties, higher cured stock durometer, and so forth.

In the adhesion tests which follow, a control (Example 4) is prepared wherein 8 phr naphthenic process oil is added to Stock B. In Example 5, thermoplastic resins are added to Stock B in an amount of 8.0 phr. The thermoplastic resins replace an equivalent amount of naphthenic process oil in (Example 4) Stock B. Earlier patents embodying rubber-to-metal adhesion testing are U.S. Pat. Nos. 4,258,770 and 4,267,079 which disclose detailed procedures for preparing and testing laboratory T-adhesion pads.

Three sets of adhesion tests are conducted for Example 4-5 and these are reported in Table III. The tests included T-adhesion determination for vulcanized specimens—unaged or unconditioned, Test A; oven aged, Test B; and steam bomb aged, Test C. The force necessary to pull or remove the metallic reinforcement from the vulcanized rubber skim stock is given first, in Kg./cm., followed by the percent of rubber skim stock remaining on the surface of the metallic reinforcement. The amount of rubber skim stock remaining on the metallic reinforcement is determined by visual examination and is reported as % rubber coverage.

TABLE III

Effects of Pamak TP As a Process Oil Replacement in Stock B

|  | Example 4 (Control) | Example 5 |
|---|---|---|
| Natural Rubber | 100 | 100 |
| Naphthenic Process Oil, phr | 8 | — |
| Pamak TP, phr | — | 8 |
| Sulfur, phr | 3.0 | 3.0 |
| NOBS Special, phr | 0.70 | 0.70 |
| Test A |  |  |
| Unaged or Unconditioned Brass Plated Steel Cord[a] Kg./cm | 26.15 | 27.68 |
| % rubber coverage | (90) | (95) |
| Test B |  |  |
| Oven Aged Brass Plated Steel Cord[b] Kg./cm | 10.86 | 11.72 |
| % rubber coverage | (80) | (85) |
| Test C |  |  |
| Steam Bomb Aged Brass Plated Steel Cord[c] Kg./cm | 28.18 | 27.50 |
| % rubber coverage | (75) | (70) |

[a]T-adhesion pads cured 30 minutes at 149° C., and tested at 110° C.
[b]T-adhesion pads cured 30 minutes at 149° C., heat aged for 2 days in a forced air oven at 121° C. and tested at 110° C.
[c]T-adhesion pads cured 30 minutes at 149° C., steam bomb aged 1 hour at 149° C. and tested at 110° C.

As can be seen in Table III, Test A, unaged adhesion and coverage retention to brass plated steel cord, is about equal to or directionally better in Example 5, which contained the thermoplastic resins as a replacement for naphthenic process oil. In Test B, the presence of the thermoplastic resin in Example 5 is about equal to or directionally better for adhesion and coverage retention to brass plated steel cord. The oven aging test is an accelerated heat aging test and significant in determining the effect of heat on the thermal stability of the chemical bonds formed between the rubber skim stock and the metallic reinforcement during vulcanization. In Test C, Examples 4 and 5 are about equal for adhesion to brass plated steel cord, while the control (Example 4) is about equal to directionally better for coverage retention.

As apparent from the above examples the substitution of thermoplastic resins for naphthenic process oil in Stock B does not impart any adverse effect on the short term wire adhesion properties and, in fact, unexpectantly offers directional improvements in unaged and oven aged adhesion to brass plated steel cord.

Having described the best mode and preferred embodiments of the invention, in accordance with the patent statutes, it is to be understood that various other embodiments can be used, with the scope of the invention being measured only by the attached claims.

What is claimed is:

1. An improved rubber stock containing conventional rubber components, wherein the improvement comprises replacing at least a portion of a petroleum derived product in the stock with a thermoplastic resin, said resin comprising carboxylic acid ester groups and derived from wood and both said petroleum-derived product and said resin not being elastomeric and being a minor portion of the stock.

2. A rubber stock according to claim 1, wherein said thermoplastic resin is derived from wood rosin, has a softening point of from about 35° C. to about 80° C., and an acid number of about 20 to about 40, and the amount of thermoplastic resin ranges from about 0.5 to about 25 parts per part by weight of petroleum-derived product which has been replaced.

3. A rubber stock according to claim 2, wherein the petroleum-derived produced replaced is selected from the group consisting of a petroleum-derived resin, a process oil, a tackifier, a softener, an extender, a processing aid, and combinations thereof.

4. A rubber stock according to claim 3, wherein the thermoplastic resin is used in said stock as a partial or total replacement for process oil or petroleum-derived resin, or both.

5. A rubber stock according to claim 1, 2 or 4, wherein the stock is cured and the thermoplastic resin is added prior to curing.

6. A rubber stock according to claim 4, wherein said rubber part is a component in a tire, and the thermoplastic resin has an acid number of from about 20 to about 35.

7. A rubber stock according to claim 4, wherein the rubber part is a tire component selected from the group consisting of a tread ply skim, stabilizer ply insert, body ply skim, sidewall, innerliner, bead filler, toe filler, chafer, undertread, tread and combinations thereof.

8. A rubber stock according to claim 1, 2 or 3, wherein the resin contains a majority of a saponifiable fraction, an unsaponifiable fraction, a fatty acid fraction, a rosin acid fraction and sterols.

9. A rubber stock according to claim 8, wherein the amount of said thermoplastic resin ranges from about 0.5 to about 10 parts per part of petroleum-derived product replaced.

10. A cured rubber stock according to claim 8, wherein the thermoplastic resin fraction contains about 15–30% unsaponifiables, 3–20% rosin acids, 3–15% fatty acids and 5–15% sterols.

11. A cured rubber stock according to claim 9, wherein the amount of resin is about 1 part per part of petroleum-derived product replaced.

* * * * *